United States Patent [19]

Soran

[11] 4,184,229
[45] Jan. 22, 1980

[54] DEVICE FOR PROCESSING POULTRY BACKS

[75] Inventor: Robert L. Soran, Modesto, Calif.

[73] Assignee: Beatrice Foods Co., Modesto, Calif.

[21] Appl. No.: 883,832

[22] Filed: Mar. 6, 1978

[51] Int. Cl.² .................................................. A22C 21/00
[52] U.S. Cl. ................................................................ 17/11
[58] Field of Search .................................... 17/11, 51, 52; 83/435.2, 409.2, 419

[56] References Cited

U.S. PATENT DOCUMENTS

| | | | |
|---|---|---|---|
| 3,738,258 | 6/1973 | Goodale | 83/419 X |
| 3,930,282 | 1/1976 | Martin et al. | 17/11 |
| 3,950,820 | 4/1976 | Duncan et al. | 17/11 |

*Primary Examiner*—Willie G. Abercrombie
*Attorney, Agent, or Firm*—Huebner & Worrel

[57] ABSTRACT

A device for processing picked and eviscerated poultry backs, each having kidneys, fatty portions on opposite sides and a tail, the device including a first conveyor for advancing the backs successively longitudinally along a prismatic slide; a pair of cutters spaced transversely of the slide for trimming the fatty portions of the backs advanced along the slide; openings in the slide which register with the kidneys of advancing backs; a control system for applying vacuum to the openings when registered with the kidneys to remove them from the backs; a second conveyor extended transversely of the first conveyor for receiving the backs from the slide and advancing them transversely therefrom; and a second cutter disposed to trim the tails from the backs as they advance along the second conveyor.

8 Claims, 11 Drawing Figures

4,184,229

DEVICE FOR PROCESSING POULTRY BACKS

BACKGROUND OF THE INVENTION

1. Field of the Invention

The present invention relates to a device for processing poultry backs, and more particularly to such a device having particular utility in commercial processing of poultry by automatically removing the kidneys, tails, and undesired fatty portions from picked and eviscerated poultry backs.

2. Description of the Prior Art

While the prior art includes methods and devices for performing various operations in commercial processing of poultry, insofar as the applicant is aware there are no known methods or devices for automatically removing less desirable portions of poultry backs which have been picked and eviscerated.

At one time poultry processing plants were predominantly engaged in production of "whole bodied" poultry in which the poultry were simply picked and eviscerated leaving the major edible portions of each bird attached. However, at the present time the majority of the birds processed are "segmented", or broken down so that a number of like portions can be marketed together. After the balance of each bird is detached, "strip backs" remain. These strip backs have the bony spine and neck attached thereto. The bony portion can be removed in prior art boning machines permitting the salvaging of valuable meat. However, the strip backs also have attached thereto the kidneys which have no direct commercial value. Also the strip backs have fatty portions and the tail, attached thereto. The value of the meat is greatly reduced by the presence of fat and the tails have some commercial value in themselves, when separated.

To enhance the overall value of the strip backs, it has been necessary manually to separate the kidneys, tails, and undesired fatty portions from the balance thereof. The labor expense of such separation, when thousands of birds are being segmented each hour, as in a modern poultry processing plant, is relatively high, as in a modern poultry processing plant, is relatively high. Such separation necessarily depends on the skill and constant attention to those performing the separation. When relatively less skillful or attentive labor is employed, either a great deal of the undesired fatty portions are not separated, resulting in de-bonded meat of lower value because of excess fat, or desirable meat is lost. Such manual separation, which requires manual handling of each back, is necessarily not as sanitary as desired.

Therefore, it has long been known that it would be desirable to have a device for processing such strip backs that would automatically, dependably, accurately, and sanitarily remove less desirable and/or separately marketable portions therefrom.

SUMMARY OF THE INVENTION

Therefore, it is an object of the present invention to provide an improved device for processing poultry backs.

Another object is to provide such a device which automatically removes less desirable portions from picked and eviscerated strip backs in the processing of segmented poultry parts.

Another object is to provide such a device which automatically performs such removal leaving the maximum amount of desirable meat on the backs with minimal inclusion of undesirable fatty portions.

Another object is to provide such a device which automatically removes the tails from the backs.

Another object is to provide such a device which automatically and accurately trims off undesired fatty portions from the backs.

Another object is to provide such a device which automatically and dependably removes kidneys attached to the backs.

Another object is to provide such a device which performs such removal with the minimum of human contact.

A further object is to provide such a device which greatly reduces the labor expense of such removal.

Still further objects and advantages are to provide improved elements and arrangements thereof in a device for the purposes described which is dependable, economical, durable, and fully effective in accomplishing its intended purposes.

DESCRIPTION OF THE PREFERRED EMBODIMENT

Figure 1:
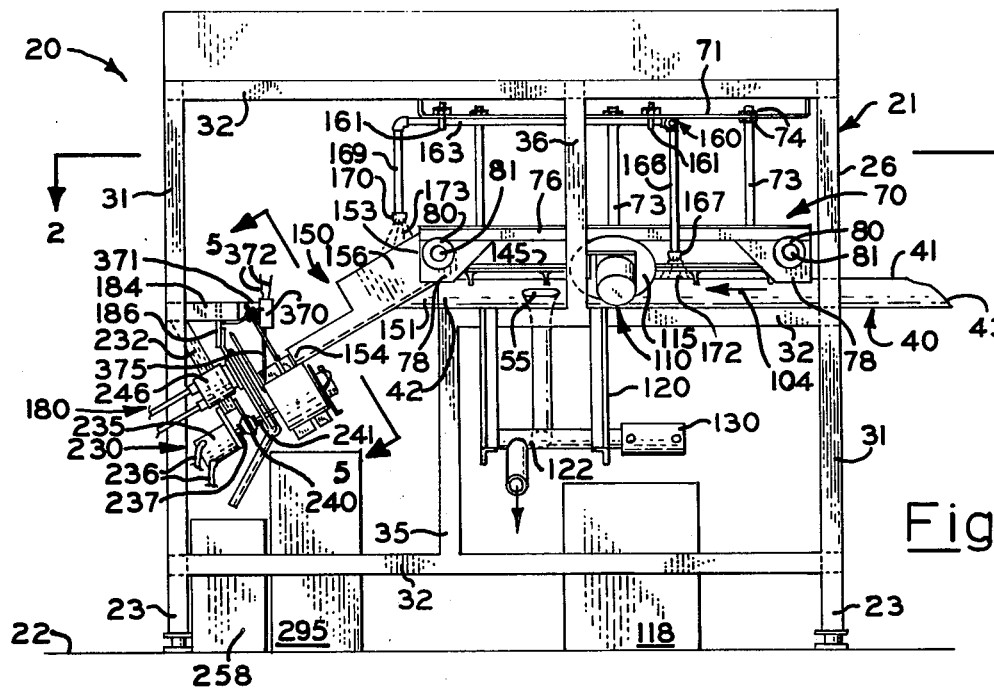
FIG. 1 is a side elevation of a device for processing poultry backs embodying the present invention.

Referring with greater particularity to the drawings, a device for processing poultry backs embodying the principles of the present invention is generally indicated by the numeral 20 in FIG. 1. The device has a frame 21 of box-like form. The frame, preferably, is shown supported on a floor 22 of a poultry processing plant.

Figure 2:
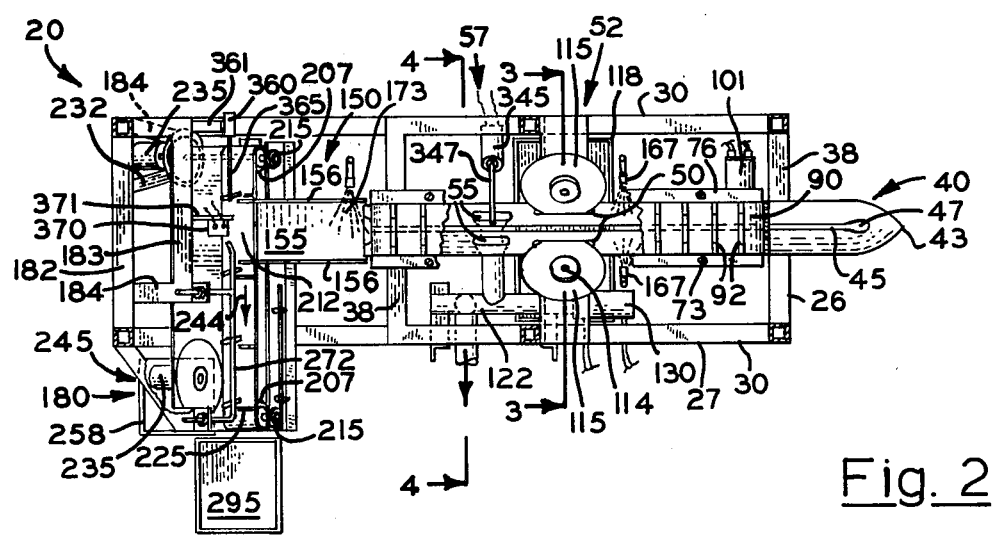
FIG. 2 is a horizontal section of the device of FIG. 1 taken on line 2—2 of FIG. 1 with portions broken away for illustrative convenience.

The frame 21 is of elongated rectangular form, as viewed from above in FIG. 2. The frame is, preferably, of unitary, welded construction. The frame has a loading end 26 at the right, as depicted in FIGS. 1 and 2 and a discharge side 27, at the bottom as depicted in FIG. 2. The frame has a pair of substantially identical, vertical half-frames 30 oppositely transversely spaced from the longitudinal axis of the frame. Each half-frame, as shown in FIG. 1, has a pair of longitudinally opposite vertical end bars 31 having their corresponding vertically opposite ends interconnected by a pair of horizontal outside bars 32. A central horizontal bar 33 extends from approximately the midpoint of the vertical end bar at the loading end of the frame. This bar extends beyond the longitudinal center of the frame toward the opposite end thereof. A first vertical bar 35 extends downwardly from the end of the central horizontal bar opposite to the loading end of the frame to the lower horizontal outside bar. A second vertical bar 36 extends upwardly from the central horizontal bar at a point thereon spaced toward the loading end of the frame from the longitudinal center thereof. The corresponding points of intersection of the bars of the half-frames are individually interconnected by a plurality of horizontal transversely extending tie bars 38. The various bars of the frame are, preferably, constructed from square metallic tubing welded into a unitary assembly.

The device 20 for processing backs includes an elongated slide member or prismatic slide 40, shown in FIGS. 1 through 4, having its axis substantially aligned with the longitudinal axis of the frame 21. The slide defines a first or longitudinal path of travel extending horizontally through the device 20 in upwardly adjacent relation to the slide. Viewed along its axis, as in FIGS. 3 and 4, the slide has a substantially right-equilateral triangular cross section with an edge 41 between equal convergent sides, upwardly disposed. The slide thus has a generally triangular prismatic outline. The slide is preferably constructed of sheet metal formed into an inverted V-shape. As best shown in FIG. 1, the side of the slide opposite to the upper edge 41 is mounted on the two tie bars 38 which join the corresponding opposite ends of the central horizontal bar 33. The slide extends longitudinally from a discharge longitudinal end 42 adjacent to the first vertical bar to an opposite pointed end or form 43 spaced outwardly of the loading end 26 of the frame, as shown in FIGS. 1 and 2. At the pointed end, the upper edge 41 of the slide is downwardly curved to a point aligned with the lower side of the slide while the surfaces and lower edges curve inwardly so as to converge to this point.

Figures 3, 4, 5:
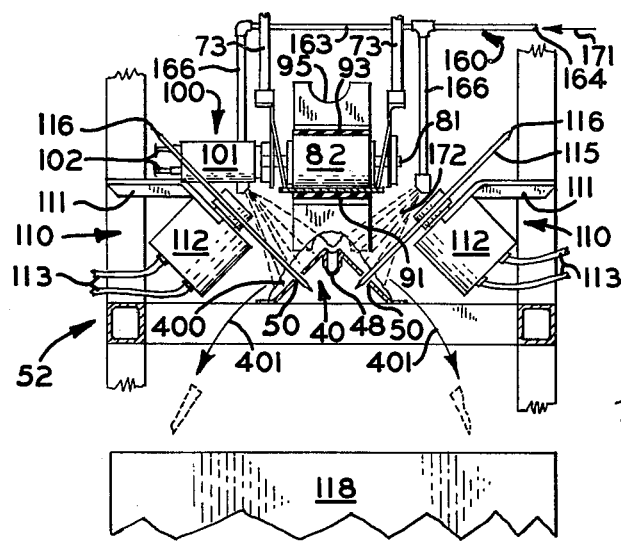
FIG. 3 is a fragmentary vertical section at an enlarged scale taken on line 3—3 of FIG. 1 showing a pair of circular saws and elements associated therewith for trimming "leaf fat" from the backs.
FIG. 4 is a fragmentary vertical section at an enlarged scale taken on line 4—4 of FIG. 2 showing a vacuum system and elements associated therewith for removing kidneys from the backs.
FIG. 5 is a fragmentary section at an enlarged scale taken on line 5—5 of FIG. 1 showing a circular saw and elements associated therewith for trimming tails from the backs.

The upper edge 41 of the slide 40 has a central slot 45 therethrough, as best shown in FIGS. 2 and 3. The opposite sides 46 of the slot are transversely spaced approximately one-half inch for a purpose subsequently to be described. The slot extends from a point between the lower edges of the slide, where the edges converge to the pointed end 43, to the opposite end of the slide. The portion of the slot between said curved edges of the slide is enlarged to form an opening 47 substantially elliptical in plan view, as shown in FIG. 2. The opposite sides of the slot are individually downwardly extended within the slide by a pair of parallel portions or strips 48 of sheet metal. The strips longitudinally are coextensive with the slot.

The slide 40 is provided with a pair of longitudinally elongated saw openings or slots 50, best shown in FIGS. 2 and 3. The saw slots extend longitudinally through each of the equal sides of the slide. Transversely, the saw slots are opposite and are equally spaced somewhat downwardly from the central slot 45. Longitudinally, the saw slots are positioned somewhat toward the loading end 26 of the frame 21 from the second vertical bars 36. The saw slots define a "leaf-fat" trimming station 52, subsequently to be described in greater detail, longitudinally along the prismatic slide.

The slide 40 is further provided with a pair of vacuum openings or slots 55, as shown in FIGS. 1, 2 and 4. The vacuum slots individually extend through the equal sides of the slide in transversely opposite relation. The vacuum slots are equally spaced downwardly from the central slot. Longitudinally of the slide, the vacuum slots are positioned centrally between the saw slots 50 and the end of the slide opposite the pointed end 43 thereof. The vacuum slots are longitudinally elongated and have arcuate longitudinally opposite ends. Each of the vacuum slots is dimensioned and proportioned to allow the passage of a poultry kidney. The vacuum slots thus define a kidney removing station 57. As shown in FIG. 4, the vacuum slots are interconnected centrally of the slide by a "Y" conduit 60 having a pair of upwardly divergent branches. The branches are each fixed in air-tight relation to the underside of the slide in circumscribing relation to a respective one of the vacuum slots. The "Y" conduit has a downwardly extending branch terminating in a circular opening 61 in communication with the vacuum slots.

The device 20 for processing poultry backs has a first or longitudinal conveyor, indicated generally by the numeral 70 and shown in FIGS. 1 through 4, 6, and 9. This conveyor extends parallel to the first path defined by the longitudinal axis of the prismatic slide 40. As shown in FIG. 1, the first conveyor includes a horizontal mounting plate 71 spaced somewhat below the upper horizontal outside bar 32 and fixed thereto, as by welding. Longitudinally, the mounting plate extends substantially from the end of the slide opposite the pointed end 43 thereof to the loading end 26 of the frame 21. A plurality of transversely aligned pairs of hanger rods 73 are mounted on the mounting plate and extend downwardly therefrom in longitudinally spaced relation, as best shown in FIG. 2. The hanger rods of each pair individually are positioned approximately above the opposite lower edges of the slide 40. The hanger rods extend through openings, not shown, in the mounting plate and are releasably secured thereto for vertical adjustment by pairs of nuts 74 screw-threadably engaging each hanger rod oppositely of the mounting plate. As shown in FIGS. 1, 3 and 4, a pair of horizontal, longitudinally extending first mounting bars 76 are fixed, as by welding, to the downward ends of all of the hanger rods disposed on one side of the slide. Said bars longitudinally are substantially coextensive with the mounting plate.

The opposite ends of each of the first mounting bars 76 are provided with an individual bearing plate 78, shown in FIGS. 1 and 3, extending downwardly therefrom. The pair of bearing plates at the corresponding longitudinal ends of the mounting bars individually are provided with a pair of bearings 80 aligned so as to define a transverse, horizontal axis. A pulley shaft 81 is rotatably received through each pair of bearings. A pulley 82 having a cylindrical periphery is mounted on each of said shafts for rotation therewith. Axially, the pulley extends between the bearing plates and centrally above the prismatic slide 40. A first backing plate 85, shown in FIGS. 1, 3, and 4, is mounted downwardly between the first mounting bars. The backing plate is mounted by a pair of inclined plates 86 individually fixed to the mounting bars and extending downwardly and centrally therebetween to the laterally opposite edges of the backing plate. Transversely, the first backing plate extends somewhat beyond the opposite axial ends of the pulleys 82, as shown in FIG. 2. Longitudinally, as shown in FIG. 1, the first backing plate extends between said pulleys with the opposite ends of the backing plate individually juxtapositioned to the pulleys.

An endless planar first conveyor belt 90, shown in FIGS. 1 through 4, is extended about the pulleys 82. The belt is frictionally engaged by the pulleys in driving relation thereto. The length of said belt disposed toward the prismatic slide 40 defines a transporting run or lower reach 91 of the first conveyor 70. The lower reach upwardly is engaged in parallel supporting relation by the first backing plate 85. The side of the belt opposite to the pulleys is provided with a plurality of members or resiliently flexible, planar panels or cleats 92, shown in FIGS. 1, 3, and 4. The cleats extend transversely across the belt and are substantially equally spaced therealong. The cleats, preferably, are unitarily constructed from a "T-shaped" extrusion of a material such as rubber, plastic or the like. Each cleat is of unitary construction and has a base 93 extending parallel to the belt and secured thereto by adhesive. Each cleat has a plate-like portion of generally rectangular shape which extends from the base to a distal edge 94. As shown in FIGS. 3 and 4, the distal edge of each cleat is spaced from the belt a distance such that, when the cleat is positioned along the lower reach 91, the distal edge is approximately at the same elevation as the upper edge 41 of the prismatic slide. Each distal end is provided with an arcuate central concavity 95.

The first conveyor 70 is provided with a corresponding first powered drive mechanism indicated generally by the numeral 100 and shown in FIGS. 2 and 3. The mechanism is mounted on the bearing plate 78 which is disposed at the loading end 26 of the frame 21 at the side thereof opposite to the discharge side. The mechanism includes an hydraulic motor 101 secured to said bearing plate oppositely of the endless belt 90. The motor is engaged in driving relation with the pulley shaft 81 at said loading end. The hydraulic motor is provided with a pair of hydraulic connections 102 for inlet and outlet of hydraulic fluid. The first powered drive mechanism is so constructed and arranged that energization of the hydraulic motor causes the lower reach 91 of the conveyor to move from the loading end 26 of the frame toward the opposite end thereof, as indicated by the arrows 104.

The leaf-fat trimming section 52 includes a pair of trimming assemblies 110, shown in FIGS. 1, 2, and 3, transversely oppositely disposed to the prismatic slide 40 at the saw slots 50 therein. Each trimming assembly has a bracket 111, shown in FIG. 3, mounting the assembly on the transversely corresponding second vertical bar 36. Each assembly has an hydraulic motor 112 mounted on its respective bracket. Each motor has a pair of hydraulic connections 113 for inlet and outlet of hydraulic fluid. A drive shaft 114 extends from each motor toward the conveyor 70 in parallel relation to the adjacent side of the prismatic slide. Each slide has a cutting member or circular saw 115 mounted at its distal end for rotation therewith. Each saw has peripheral, knife-like cutting edge 116. The peripheries of the saws individually extend somewhat into the saw slots 50 and substantially perpendicularly to their respective sides of the slide. The cutting edges of the saws are thus disposed in planes parallel to the first path longitudinally through the device 20. The leaf-fat trimming station also includes an upwardly open container 118 resting on the floor 22 below the circular saws 115.

Figure 6:
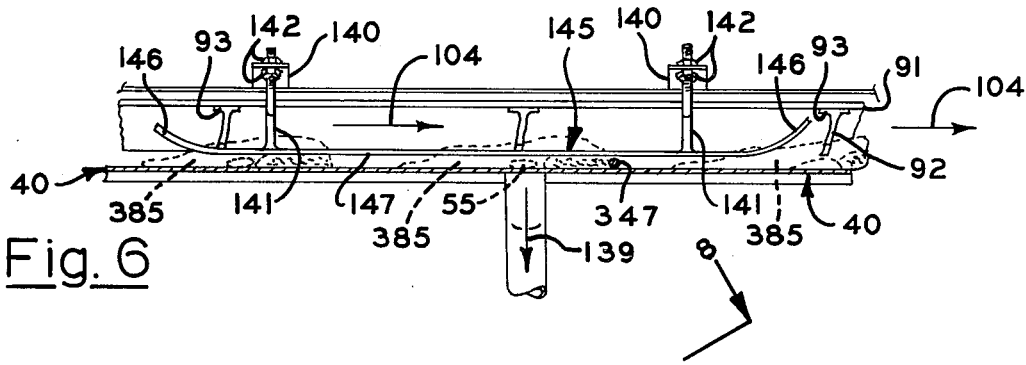
FIG. 6 is a fragmentary section of the vacuum system and associated elements.

The kidney removal station 57 includes a pair of L-shaped brackets 120, shown in FIGS. 1, 2 and 6. Each bracket has a vertical arm fixed, as by welding, to the outside of the central horizontal bar 33 at the discharge side of the device 20. Longitudinally, the brackets are spaced approximately equally oppositely from the vacuum slots 55 in the prismatic slide. Each vertical arm extends downwardly from said bar to a horizontal arm extending inwardly of the frame 21 as shown in FIG. 4. A vacuum valve 122, shown in FIGS. 1, 2, 4 and 9 is mounted on the lower arms of said bracket. The valve has a cylindrical body 123 whose axis extends longitudinally of the frame 21. The body is secured at its opposite axial end portions to the brackets 120. The end portion of the body disposed oppositely of the loading end 26 of the frame has a tubular outlet connection 125 which, as shown in FIG. 4, extends downwardly from the body and then curves so as to open toward the discharge side of the frame. The body has a tubular inlet connection 126 opening toward the side of the frame opposite to the discharge side thereof. As shown schematically in FIG. 9, the opposite ends of the body are closed. The end of the body toward the loading end of the frame is provided with a pneumatic cylinder 130 coaxially related to the body. The pneumatic cylinder has an opening pneumatic connection 131 in the end of the cylinder adjacent to the body. The opposite end of the body is provided with a closing pneumatic connection 132. The vacuum valve is provided with a valve piston 134 within the body and a pneumatic piston 135 within the pneumatic cylinder. The pistons are rigidly connected for unitary axial movement by a piston rod 136 passing through the end of the body adjacent to the pneumatic cylinder. The length of the piston rod is such that pneumatic pressure applied to the closing connection 132 urges the pistons to the position shown in solid lines in FIG. 9. The vacuum piston separates the inlet and outlet connections of the valve. Conversely, application of pressure to the opening connection 131 urges the pistons to the positions shown in dash lines in which the vacuum piston is disposed between the pneumatic cylinder and the outlet connection. Communication is thus established between the inlet connection and the outlet connection.

The inlet connection 126 of the vacuum valve 122 is connected by a conduit 138 to the downward opening 61 in the "Y" conduit 60 which communicates with the vacuum slots 55. The outlet connection 125 of the vacuum valve is connected to any suitable source of vacuum, not shown. The source of vacuum is provided with well-known devices for removing for disposal objects urged into the source by a flow of air theretoward. As readily can be understood, application of pneumatic pressure to the opening connection 131 opens communication through the vacuum valve between the vacuum source and the vacuum slots. Opening of such communication applies vacuum to the slots inducing a flow of air through the slots as indicated by the arrow 139 in FIG. 4. On the other hand, application of pneumatic pressure to the closing connection 132 as described closes the conduit between the slots and the vacuum sources stopping the flow of air.

The kidney removal station 57 includes, as shown in FIGS. 4 and 6, two longitudinally spaced pairs of mounting projections 140 fixed, as by welding, to the backing plate 85 of the first conveyor 70. Transversely, the projections of each pair extend oppositely outwardly from the backing plate. Longitudinally, the pairs of projections are spaced oppositely of the vacuum slots 55, as shown in FIG. 6. As best shown in FIG. 4, a mounting rod 141 has an upper portion extending vertically through an opening, not shown, in each of the projections. The rod is releasably secured to its respective projection for vertical adjustment relative thereto by a pair of nuts 142 screw-threadably engaging the upper portion of the rod oppositely of the objection. The lower portion of each rod is angularly related to the upper portion thereof so as to extend substantially perpendicularly toward the adjacent side of the prismatic slide 40 to a distal end adjacent thereto. A pair of elongated hold down plates 145 individually are fixed, as by welding, on the distal ends of the two mounting rods at each side of the slide. The plates extend longitudinally of the slide beyond their respective mounting rods to opposite ends 146 curved away from the slide. The central portion 147 of each plate between the rods is substantially parallel to its respective side of the prismatic slide.

The device 20 for processing poultry backs includes a chute 150, shown in FIGS. 1, 2, and 5, mounted on one of the tie bars 38 connecting the upper ends of the second central vertical bars 36 by lugs 151. The chute extends downwardly and longitudinally of the frame 21, from an upper end 153 juxtapositioned to the discharge end 42 of the prismatic slide to a lower end 154. As shown in FIG. 1, the lower end of the chute is longitudinally disposed centrally between the discharge end of the slide and the vertical end bars 31 opposite to the loading end of the frame. The lower end is disposed somewhat below the elevation of the central horizontal bars 33. Operationally, as shown in FIG. 2, the chute constitutes an extension of the prismatic slide and defines a transfer path extending downwardly and oppositely of the loading end of the frame from the first path. The chute is unitarily constructed of sheet metal and has a rectangular lower portion 155 and a pair of wings 156 individually extending upwardly therefrom at the transverse edges thereof. The width of the chute is such that the wings individually are closely adjacent to the opposite axial ends of the pulley 82 at the discharge end of the slide. As shown in FIG. 1, the end portion of each wing disposed toward the slide extends upwardly a greater distance than the opposite, lower end portion of the wing.

The device 20 is provided with a water spray system, indicated generally by the numeral 160 and shown in FIGS. 1, 2, and 3. This system is mounted on and downwardly of the mounting plate 71 by a plurality of U-bolts 161. The spray system includes a transverse pipe 163 extending from a water inlet 164 thereto at the discharge side of the frame across the prismatic slide 40. A pair of vertical pipes 166 individually extend downwardly from the transverse pipe toward an opposite side of the prismatic slide 40. The lower end of each vertical pipe has an individual spray nozzle 167 directed toward the adjacent side of the slide. A pipe 169 extends longitudinally from the transverse pipe to a point upwardly of the chute 150 and then downwardly to a spray nozzle 170. This nozzle is directed toward the upper surface of the rectangular lower portion of the chute. The water inlet is connected to a source of water under pressure, and the spray nozzles 167 and 170 are in fluid communication with the inlet through the pipes 163, 166 and 169. As a result, water can enter the inlet, as indicated by the arrow 171 in FIG. 2, for spray discharge from the nozzles 165 at opposite sides of the slide, as indicated by the numeral 172 in FIGS. 2 and 3. Similarly, water is spray-discharged from the nozzle 170 onto the chute, as indicated by the numeral 173 in FIG. 2.

The device 20 for processing poultry backs has a tail trimming station, indicated generally by the numeral 180 and shown in FIGS. 1, 2, 5, 7 and 9. This station is disposed at the end of the frame 21 opposite to the loading end 26 thereof and downwardly of the prismatic slide 40 defining the first path.

Figure 7:
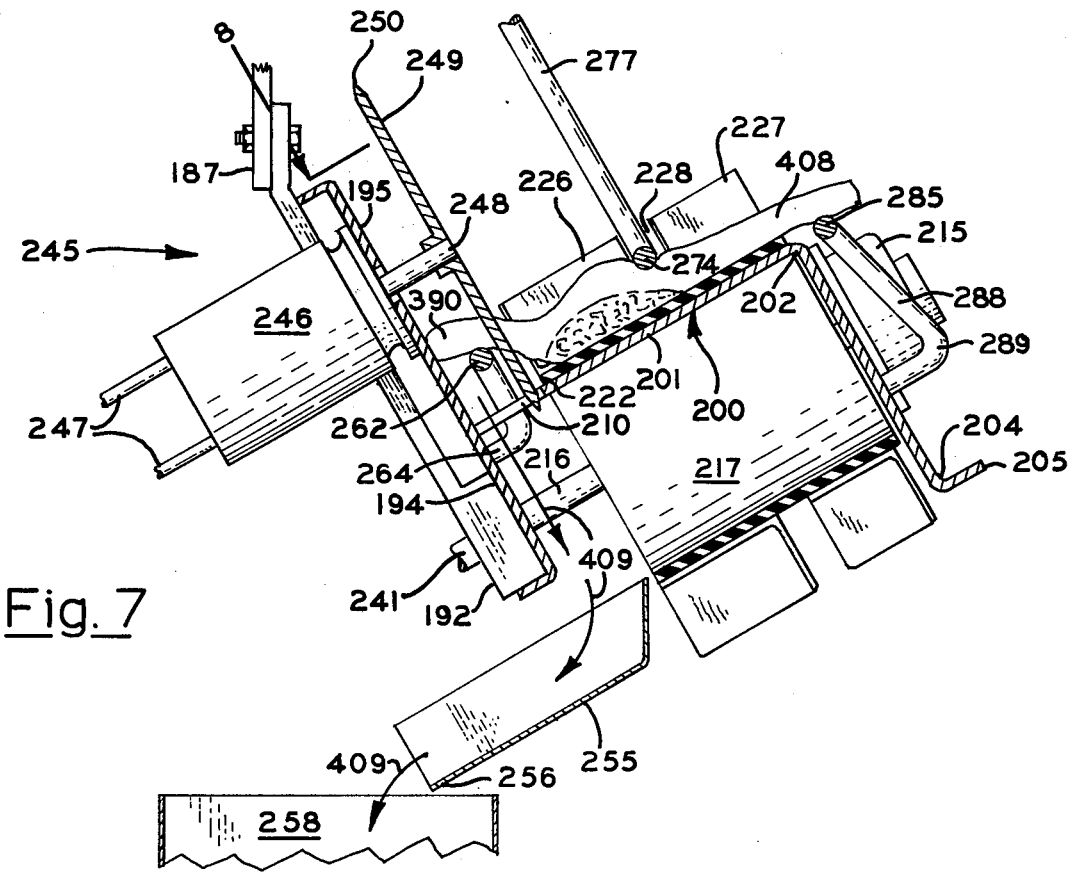
FIG. 7 is a fragmentary vertical section at an enlarged scale taken on line 7—7 of FIG. 5 depicting the saw of FIG. 5 trimming a tail from a poultry back.

The tail trimming station 180 includes a horizontal tie bar 182 extending between the pair of vertical end bars 31 opposite to the loading end 26 of the frame 21. A horizontal second mounting bar 183 is supported from said tie bar in substantially parallel relation thereto by a pair of longitudinally bars 184 extending therebetween. The length of the mounting bar 183 is approximately three-fourths of the width of the frame, and said bar extends transversely from the side of the frame opposite to the discharge side 27 thereof toward the discharge side. Longitudinally of the frame, the mounting bar is spaced toward the discharge end 42 of the prismatic slide 40 from the tie bar 182 approximately one-third of the distance therebetween. The bars 182, 183, and 184 are fixedly connected to each other and to the frame 21 in any suitable manner, as by welding. A bracket 186, best shown in FIGS. 1 and 7, is fixed to the vertical end bar 31 at the discharge side 27 of the frame opposite to the loading end 26 thereof. Said bracket extends horizontally and outwardly from the discharge side of the frame toward a point transversely aligned with the second mounting bar 183 and then downwardly to a distal end 187 approximately at the elevation of said mounting bar.

The tail removing station 180 includes a second or transverse conveyor, indicated generally by the numeral 190 and best shown in FIGS. 1, 2, 5, 7, and 9. This conveyor is mounted on the second mounting bar 183 and on the distal end 187 of the bracket 186 by a pair of downwardly elongated, planar bearing brackets 192 shown in FIGS. 1 and 7. The upper end of one of said bearing brackets is secured, as by bolts, to the distal end 187 of the bracket 186. The upper end of the other of said bearing brackets is similarly secured to the second mounting bar 183 oppositely of the chute 150 from the discharge side 27 of the frame 21. As shown in FIG. 1, said bearing brackets extend in a plane normal to the transfer path defined by the chute downwardly and toward the loading end 26 of the frame from their respective upper ends.

A shallow channel member 194, best shown in FIGS. 1, 5, and 7 is fixed, as by welding, to the bearing brackets 192 and extends transversely therebetween. The planar side of the member is disposed toward the chute 150 defining a planar guide 195 normal to the transfer path defined by the chute. A transversely extending second backing plate 200, best shown in FIGS. 5 and 7, is mounted on the planar uide 195. The plate has one edge fixed, as by welding, to said guide. The plate has a first portion 201 extending at right angles from the guide parallel to the transfer path defined by the chute 150 to a first bend 202. The plate has a second portion 203 extending downwardly from the first bend and parallel to the planar guide to a second bend 204 opposite the lower edge thereof. A stiffening lip 205 extends from the second bend perpendicularly to the second portion. Transversely, the second portion of the backing plate is substantially coextensive with the planar guide 195. However, as shown in FIG. 2, the transversely opposite edges 207 of the first portion of the backing plate are inwardly spaced from the corresponding ends of the planar guide and the second portion. Said first portion has a slot 210 therein extending inwardly from the edge thereof outwardly of the discharge side 27 of the frame 21. The slot extends inwardly from said edge adjacent to the planar guide approximately to said side.

The planar guide 195 and the intersecting first portion 201 of the second backing plate 200 define a second or transverse path extending horizontally through the device 20 parallel to said guide and said plate. Said path extends horizontally and upwardly of the intersection of the guide and the backing plate and at right angles to the transfer path defined by the chute 150. The intersection of the transfer path and the second path defines a receiving station 212 along the second conveyor 190.

Each transversely corresponding pair of ends of the planar guide 195 and the second portion 203 of the second backing plate 200 is provided with a pair of aligned bearings 215, best shown in FIGS. 5 and 7. The bearings define an axis normal to the planar guide. The axis extends centrally between the first and second bends of said backing plate and transversely outwardly of the transverse edges 207 of the first portion 201 of the backing plate. A pulley shaft 216 is rotatably received in each of the pairs 215 of bearings. A pair of substantially identical, peripherally cylindrical pulleys 217 are mounted individually on shafts for rotation therewith. The diameters of the pulleys are such that the upper portions of their peripheries are substantially aligned with the upper surface of the first portion of the second backing plate. Axially, the pulleys extend from the second portion of the backing plate to the slot 210 in the first portion 201 thereof.

An endless, planar second conveyor belt 220 is extended about the pulleys 217, as best shown in FIG. 5, in frictional driving relation. The belt has a transparting run or an upper reach 221 downwardly engaged in parallel supporting relation by the first portion 201 of the second backing plate 200. The upper reach has a lower lateral or transverse edge 222 adjacent to the planar guide 195. The side of the belt opposite to the pulleys is provided with a plurality of substantially identical pairs of cleats 225, best shown in FIGS. 7 and 8, substantially equally spaced therealong. The cleats are planar and rectangular in shape and extend perpendicularly from the belt. The cleats are similar to the cleats 92 of the first conveyor 70 being formed of a resilient, flexible material, such as rubber, and being fixed, as by adhesive, by individual, unitary bases to the belt. Each pair of cleats has a wide cleat 226 disposed at the side of the belt toward the planar guide 195 and a narrow cleat 227 disposed at the opposite side of the belt. These cleats extend an equal distance perpendicularly from the belt. Transversely of the belt, the wide cleat extends from its respective side of the belt to approximately the center of the belt. The wide cleat is disposed in angular relation to the belt so that, when the cleat is on the upper reach of the belt, the edge of the cleat adjacent to the planar guide is positioned forwardly of the opposite edge. The edge of the narrow cleat centrally of the belt is transversely spaced from the adjacent edge of the wide cleat defining a gap 228 between the cleats centrally of the belt. The narrow cleat extends transversely of the belt from the gap to the side of the belt opposite to the planar guide. Longitudinally of the belt, the narrow cleat is aligned with the edge of the wide cleat adjacent to the planar guide.

As best shown in FIG. 5, the conveyor 70, including portions of the planar guide 195, the second backing plate 200, the belt 220, and one of the pulleys 217 and the elements related thereto, extends transversely outwardly from the discharge side 27 of the frame 21 upwardly of the floor 22.

The second conveyor 190 includes a corresponding second powered drive mechanism indicated generally by the numeral 230 and best shown in FIG. 1. This drive mechanism is connected in rotational driving relation to the pulley shaft 216 adjacent to the side of the frame 21 opposite to the discharge side thereof. Said drive mechanism includes a triangular frame 232 having its base fixed, as by welding, to the tie bar 182. The triangular frame extends downwardly in a plane normal to the axis of said pulley shaft to an apex substantially aligned with this axis. The drive mechanism includes an hydraulic motor 235 mounted on the apex of the triangular frame oppositely of said shaft. The motor is provided with a pair of hydraulic connections 236 for inlet and outlet of hydraulic fluid. The motor has a drive shaft 237 extending therefrom toward, and aligned with, said pulley shaft. A well-known pneumatic clutch 240 is mounted on the apex of the triangular frame oppositely of the hydraulic motor and is connected in driven relation to the shaft thereof. The clutch has an output shaft 241 extending from the clutch toward said pulley shaft in coaxial relation therewith and connected in rotational driving relation thereto. The clutch has a pneumatic connection 242 and is so constructed and arranged that application of pneumatic pressure thereto engages the clutch. Such engagement connects the motor shaft and the clutch output shaft in rotational driving relation. Conversely, removal of pneumatic pressure from the connection terminates said relation. The second powered drive mechanism is so constructed and arranged that energization of the hydraulic motor causes the upper reach 221 to move from the chute 150 toward the discharge side 27 of the frame 21, as indicated by the arrows 244.

The tail removing station 180 is provided with a tail trimming assembly, indicated generally by the numeral 245 and shown in FIGS. 1, 2, 5 and 7, disposed upwardly of the slot 210 in the second backing plate 200. The assembly has an hydraulic motor 246 mounted in the channel member 194. The motor is provided with a pair of hydraulic connections 247 for inlet and outlet of hydraulic fluid. The motor has a drive shaft 248 extending therefrom perpendicularly to the planar guide 195 and centrally above the slot. The shaft extends from the guide, as best shown in FIG. 7, for a distance approximately equal to the width of the slot 210. A circular saw 249 is mounted on the shaft in rotationally driven relation therewith. The saw is disposed substantially parallel to the planar guide and extends between the guide and the lower edge 222 of the upper reach 221 of the belt 220. The diameter of the saw is such that it extends into the slot 210. The saw is provided with a peripheral, knife-like cutting edge 250.

The tail removing station 180 is provided with a trough 255, best shown in FIGS. 1 and 7, mounted on and downwardly of the channel member 194 beneath the saw 249. The trough extends from the edge of the belt 220 adjacent to the planar guide 195 downwardly and oppositely of the belt to an open lower end 256 disposed downwardly of the motor 235. An upwardly open tail receiving container 258, shown in FIGS. 2, 5 and 7, is positioned below the lower end of the trough and is supported by the floor 22.

Figure 8:
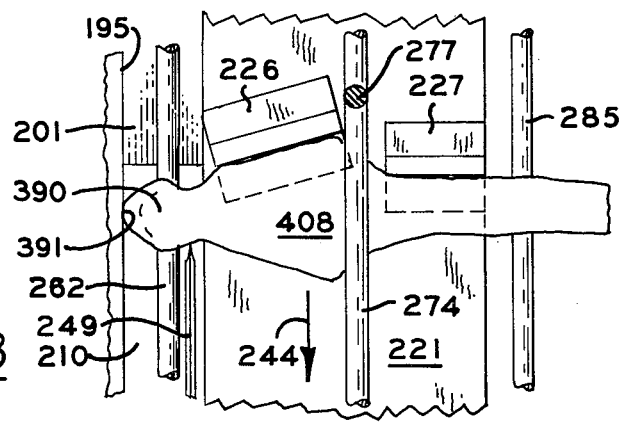
FIG. 8 is a fragmentary section at a further enlarged scale taken on line 8—8 of FIG. 7.

The tail trimming station 180 includes a cylindrical cam rail 260, best shown in FIGS. 5, 7, and 8, mounted on the planar guide 195. The rail extends generally transversely of the frame 21 and parallel to the planar guide 195. The rail is spaced from the guide a distance approximately one-half of the distance of the circular saw 249 therefrom as shown in FIG. 7. As shown in FIG. 5, the rail has a guide portion 262 extending substantially from the end of the planar guide at the discharge side 27 of the frame to a point opposite to the saw therefrom. Elevationally, the guide portion is positioned centrally between the upper reach 221 of the belt 220 and the shaft 248 of the saw. The rail has a lifting portion 263 extending transversely and downwardly from the first portion of the rail to the first portion 201 of the second backing plate 200. The transversely opposite ends 264 of the cam rail are bent toward the channel member 194 and fixed thereto, as by welding.

The tail removing station 180 has a hold down assembly, indicated generally by the numeral 270 and best shown in FIGS. 5, 7, and 8. The assembly has a pair of mounting lugs 271 disposed transversely oppositely of the saw 249. The lugs are individually fixed, as by welding, on the second mounting bar 183 and the bracket 186. As shown in FIG. 1, the lugs extend toward the loading end of the frame in substantially parallel relation to the upper reach 221 of the belt 200. Each of the lugs has a bore, not shown, extending therethrough substantially perpendicular to the upper reach 221 of the belt 220 and aligned with the gap 228 between the cleats 226 and 227. The assembly has a first cylindrical rod indicated generally by the numeral 272. The first rod has a mounting length 273 extending through the bore in the lug which is fixed to the bracket 186. The rod extends from this lug toward the upper reach, as best shown in FIG. 5. Adjacent to the upper reach, the rod is bent so as to form a hold down length 274. This length extends at right angles to the mounting length, parallel to the upper reach, and centrally through the gap between the cleats to a point beyond the circular saw 249. The hold down length is spaced from the upper reach. The rod has an angled length 275 extending upwardly from the hold down length to a distal end disposed transversely centrally and upwardly of the lower end 154 of the chute 150. The hold down assembly has a second rod 277 fixed, as by welding, to the hold down length of the first rod and extending perpendicularly therefrom through the bore in the mounting lug 271 fixed to the mounting bar. Each of the respective ends of the first and second rods extending through the bores in the mounting lugs are provided with screw-threads 278. The screw-threads of each rod are engaged by a pair of nuts 279 engaging the rod oppositely of its respective lug for clampable axial adjustment of the rod relative to the lug.

The tail removing station 180 has a cylindrical support rail 285, best shown in FIGS. 5, 7, and 8. The rail is fixed, as by welding, on the second portion 203 of the second backing plate 200 oppositely of the belt 220. The rail, as best shown in FIG. 5, extends generally transversely and parallel to said second portion. The rail has an axial end 286 transversely disposed centrally of the lower end 154 of the chute 150 and elevationally disposed downwardly of and adjacent to the upper reach 221 of said belt. The support rail extends linearly from said end beyond the saw 249 to an opposite end 287 lying approximately in the plane of the upper reach 221 of the belt. A pair of mounting rods 288 are fixed to the support rail downwardly thereof and axially spaced therealong oppositely of the saw. The mounting rods extend downwardly from the rail to individual bends 289 from which the rods extend substantially horizontally to said second portion of the second backing plate, as best shown in FIG. 7.

The device 20 for processing poultry backs is provided with an upwardly open processed back receiving container 295, shown in FIGS. 1, 2, and 5. The container is supported by the floor 22 and is disposed downwardly of the portion of the conveyor 70 projecting from the discharge side 27 of the frame 21 and oppositely of the frame from said portion.

Figure 9:
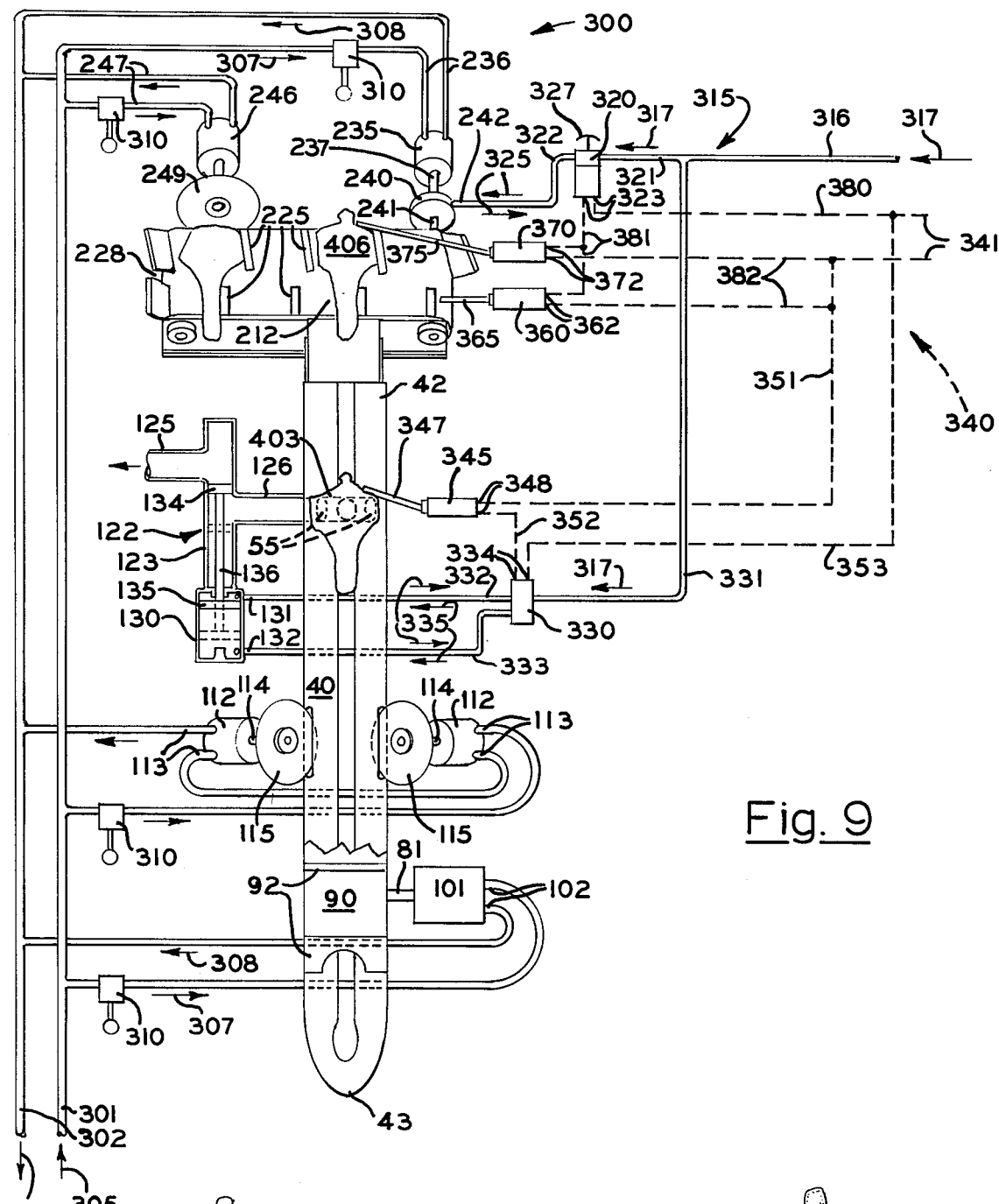
FIG. 9 is a diagrammatic view of a control system for the device together with related elements thereof.

The device 20 is provided with a control system depicted schematically in FIG. 9 together with schematic representations of the first conveyor 70, the second conveyor 190, and elements associated with the conveyors.

The control system includes an hydraulic subsystem, indicated generally by the numeral 300, having an inlet manifold 301 and an outlet manifold 302. Hydraulic fluid under pressure enters the inlet manifold as indicated by the arrow 305 from a source, not shown. Hydraulic fluid flows from the outlet manifold, as indicated by the arrow 306, to the source. The inlet and outlet manifolds are connected in a well-known manner to the hydraulic connections 102, 113, 236, and 247 for inlet and outlet of hydraulic fluid, respectively, to the hydraulic motors 101, 112, 235, and 246. The flow of fluid to the individual motors is indicated by the arrows 307 and the flow of fluid from the motors is indicated by the arrows 308. Each of the inlet connections is provided with a flow control valve 310 for individually adjusting the rotational speed imparted by the motors to their respective drive shafts.

The hydraulic motor 101 driving the first conveyor 70, the hydraulic motors 112 individually rotationally driving the circular saws 115 of the leaf-fat trimming assemblies 110, and the hydraulic motor 246 rotationally driving the circular saw 249 of the tail trimming assembly 245 are continuously energized while the device 20 is in operation so that elements driven thereby are continuously in rotation at the speed determined by the respective flow control valves 310. When the device is in operation, the motor 235 for driving the second conveyor 190 is also continuously energized so that the drive shaft 237 continuously rotates. However, as previously described, the rotational drive is only imparted to the second conveyor when pneumatic pressure is applied to the connection 242 to engage the clutch 240. When the clutch is so engaged, the motor 235 drives the conveyor at a speed determined by the respective flow control valve.

The control system includes a pneumatic subsystem, indicated generally by the numeral 315. The pneumatic subsystem has an inlet 316 connected to a source, not shown, of air under pressure from which air enters the subsystem and flows therein as indicated by the arrows 317.

The pneumatic subsystem 315 includes a clutch control pneumatic solenoid valve 320 connected to the air inlet 316 by a pneumatic conduit 322. The solenoid valve is also connected to the pneumatic connection 242 of the clutch by a pneumatic conduit 322. The solenoid valve is provided with a pair of electrical terminals 323. The valve is of a well-known type, being constructed and arranged so that electrical energization of the valve, by application of a suitable electric potential across the electrical terminals, causes the conduits 322 and 242 to be pneumatically connected. Such connection results in the flow of air under pressure to the clutch causing it to engage. When the valve is electrically de-energized, pneumatic communication is closed between said conduits, and the conduit 322 to the clutch is connected to the atmosphere so that the clutch is disengaged. The flow of air in the conduit 322 between the valve and the clutch is indicated by the arrows 325. The solenoid valve is provided with a button 327 which, when manually depressed, causes the valve to function in the same manner as if electrically energized.

The pneumatic subsystem includes a vacuum control solenoid valve 330. The vacuum solenoid valve is connected by a pneumatic conduit 331 to the air inlet 316. The valve is also connected by a pneumatic conduit 332 to the opening connection 131 of the pneumatic cylinder 130 and by a pneumatic conduit 333 to the closing connection 132 of the cylinder. The solenoid valve can be electrically energized by application of a suitable electrical potential to a pair of electrical terminals 334 thereof. The valve is of a well-known type, being constructed and arranged so that, when it is electrically energized, the opening conduit 332 is caused to communicate with the air inlet and the closing conduit 333 is caused to communicate with the atmosphere. When the solenoid valve is energized, pneumatic pressure is applied to the opening connection of the pneumatic cylinder and released from the closing connection thereof. This in turn results, as previously described, in connection with the vacuum valve 122, in the application of vacuum to the openings 55 in the prismatic slide 40. Conversely, when the valve is electrically deenergized the opening conduit of the pneumatic cylinder communicates with the atmosphere and the closing conduit communicates with the air inlet. As a result, pneumatic pressure is applied to the closing connection and removed from the opening connection so that vacuum is not applied to said openings in the slide. The flow of air through the conduits 332 and 333 is indicated by the arrows 335.

The control system of the device 20 for processing poultry backs includes an electrical subsystem, indicated generally by the numeral 340, in which the electrical conductors are indicated by dash lines. The electric subsystem has a pair of terminals 341 connected across any suitable supply, not shown, of electric potential for operating the solenoid valves 320 and 330.

The electrical subsystem 340 includes a vacuum control electric switch 345, shown in FIGS. 2, 4, and 9, mounted by a lug 346 on the central horizontal bar 33 opposite to the discharge side 27 of the frame 21. The switch is of well-known construction having an elongated, pivotally mounted mounting rod 347 extending therefrom and a pair of electrical terminals 348. The switch is so constructed and arranged that the rod resiliently is urged to a central, extended position as shown in FIG. 3 which causes the terminals electrically to be open. Pivotal movement of the rod from the central position, as shown in FIG. 9, causes the terminals electrically to be connected. That is, the switch is of the "normally open" type. The switch is mounted so that, as shown in FIGS. 3 and 4, when the rod is in its central, extended position, it extends parallel to the sides of the slide 40 adjacent to the switch. In such a position, the rod extends to a point centrally of the vacuum opening 55 adjacent to the switch. The switch is electrically connected, as shown in FIG. 9, from one of its terminals 348 to one of the supply terminals 341 by a conductor 351. The opposite terminal of the switch is connected to one of the terminals 334 of the vacuum control solenoid valve 330. An electrical circuit through the valve and the switch is completed by a conductor 353 connecting the opposite terminal of the solenoid valve to the opposite supply terminal 341. As a result, movement of the rod to the position shown in FIG. 9 causes the completion of this circuit so as to energize the solenoid valve and apply vacuum to the openings 55 in the manner previously described. Such movement of the rod can be caused by engagement therewith of an object moving along the first conveyor 70, as indicated by the arrows 104 into registration with said openings. The switch thus, in effect, senses such registration with the openings.

The electrical subsystem 340 includes a first control or conveyor stopping electric switch 360 mounted by a bracket 361 on the second mounting bar 183 as shown in FIGS. 2, 5, and 9. The switch is mounted at the receiving station 212. The switch is mounted so as to be in alignment with a line extending through the narrow cleats 227 of the belt 220 when these cleats are on the upper reach 221 of the belt. The stopping switch is similar to the vacuum switch 345 in that the stopping switch has a pair of electrical terminals 362 and an elongated, pivotally mounted actuating rod 365. However, the stopping switch is of the "normally closed" type in that the terminals thereof electrically are connected when the rod is in its centrally extended position and are disconnected when the rod is moved from this position. As shown in FIG. 5, the switch is so positioned and the length of the rod is such that the rod is engaged downwardly by each wide cleat as the cleat moves in a path about the pulley 217 opposite the discharge side 27 of the frame 21. The switch and the rod are proportioned and arranged so the rod is moved sufficiently to open the electrical connection between the terminals when each narrow cleat reaches a predetermined position on the upper reach 221. In this position the cleat is spaced somewhat toward said pulley from the edge of the chute 150 opposite the discharge side. In effect, the switch thus senses the presence of a pair of cleats 225 adjacent to the receiving station 212 when the cleats are disposed so as to move theretoward upon continued movement of the belt 220. The length of rod is such that, as shown in FIG. 9, when the cleat has moved with the upper reach from the position just described, the cleat moves out of engagement with the rod allowing the rod to move to its central position and establishing electrical connection between the terminals 362.

The electrical subsystem 340 includes a second control or conveyor starting electrical switch 370, shown in FIGS. 1, 2, 5, and 9. The switch is mounted upwardly of the edge of the belt 220 adjacent to the planar guide 195 by a lug 371 on the second mounting bar 183. The switch is disposed substantially in a vertical plane extending through the side of the chute 150 opposite to the discharge side 27 of the frame 21. The switch is similar to the "normally open" vacuum control switch 345 having a pair of electrical terminals 372 and an elongated, pivotally mounted actuating rod 375. The portion of the rod adjacent to the switch is urged resiliently to extend centrally from the switch adjacent thereto shown in FIG. 5. The distal portion of the rod is angularly related to the portion adjacent to the switch, extending therefrom downwardly to a point aligned with the extension of the longitudinal centerline of the chute 150. The distal end of the rod is thus positioned substantially at the intersection of the transfer path defined by the chute and the transverse path defined by the planar guide 195 and the second backing plate 200. The switch is so constructed and arranged that the terminals thereof electrically are disconnected when the rod is in the position shown in FIG. 1. However, when the distal end of the rod is moved transversely of the belt 220, as indicated in FIG. 9, the terminals are electrically connected.

As shown in FIG. 9, an electrical conductor 380 connects one of the terminals 323 of the clutch control solenoid valve with one of the electrical supply terminals 341. The opposite terminal of the valve is connected by a conductor 381 to one of the terminals 362 of the stopping switch 360 and to one of the terminals 372 of the starting switch 370. The opposite terminals of these switches are connected by individual conductors 382 with the supply terminal 341 opposite to the supply terminal connected to the solenoid valve The starting switch and the stopping switch are thus connected in parallel between the electrical supply terminals and the clutch solenoid valve so that the solenoid valve is energized when either of the switches is "closed" and is de-energized when both of the switches are "open".

When no object is on the upper reach 221 of the belt 220, as shown in FIG. 5, the starting switch 370 is in its normal or "open" position so that the clutch solenoid valve 320 electrically is not energized through the starting switch. However, when no narrow cleat 227 is engaged with the rod 365 of the stopping switch 360, this switch is in its normal or "closed" position so that the solenoid valve is energized therethrough although the starting switch is open. As a result, the solenoid valve, as previously described, causes air under pressure to be supplied to the pneumatic clutch 240 causing the clutch to engage so that hydraulic motor 235 powers the upper reach 221 in the direction indicated by the arrows 244. Such movement of the upper reach brings one of the wide cleats to the position shown in FIG. 5 so that the cleat engages the rod of the stopping switch and pivots the rod from its central position causing the stopping switch to open and to de-energize the clutch solenoid valve. As previously described, such de-energization causes the valve to release air pressure from the clutch so that the clutch disengages and the belt 220 is no longer driven by the hydraulic motor. The belt then remains in the position shown in FIG. 5 until the starting switch 370 is closed and, in effect, overrides the stopping switch. Such closure of the starting switch occurs when an object such as a poultry back moving downwardly of the chute 150 is received on the upper reach at the receiving station 212 and moves downwardly therein toward the planar guide 195 so as to engage the rod 375 of the starting switch and pivot the rod from its central position. The starting switch thus, in effect, senses the presence of an object at the receiving station 212. When the starting switch is closed, the solenoid valve is energized causing, as previously described, the upper reach to move away from the stopping switch as indicated by the arrows 244 and to carry the cleat engaged with the rod of the stopping switch out of such engagement permitting the stopping switch to close. The upper reach then continues to move carrying the object out of engagement with the starting switch rod. Such movement continues until the movement of the belt is again stopped, as previously described, by engagement of the next cleat in succession with the rod of the stopping switch.

Figure 10:
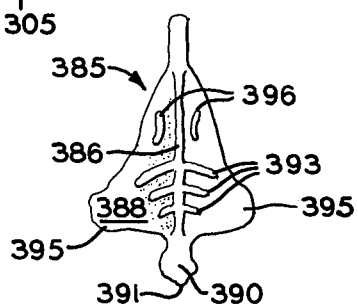
FIG. 10 is a plan view of a complete poultry strip back as viewed from the interior side of the poultry.

A poultry "strip back" 385 is depicted in FIG. 10 in a condition for processing by the device 20. The balance of the bird previously has been removed in processing, such as by picking and eviscerating, operations unrelated to the present invention. The strip back includes a central ridge or spine 386 defining a longitudinal dimension for the strip back. The back has a transverse dimension at right angles to the spine and extending horizontally as the back is viewed in the plan view of FIG. 10. The back has an upward exterior side 387 and an opposite downward, generally concave interior surface or side 388. These sides thus correspond to the position of the back of a bird before picking and eviscerating. The strip back includes a tail 390 extending longitudinally from one end of the spine to a distal end 391. The strip back includes a pair of meaty and bony portions 392 disposed adjacent to the spine and transversely opposite thereof. Said portions extend downwardly from the spine and include ribs 393 distended from the spine. The ribs extend from the spine to distal ends. Adjacent to the tail, the successive ribs are shorter as the tail is approached. The strip back includes a pair of flexible "leaf fat" portions 395 individually extending transversely oppositely of the meaty and bony portions toward the tail. The strip back includes a pair of kidneys 396 loosely connected thereto. The kidneys are disposed interiorly of the back downwardly of the meaty and bony portions, as indicated by the dash lines.

Figure 11:
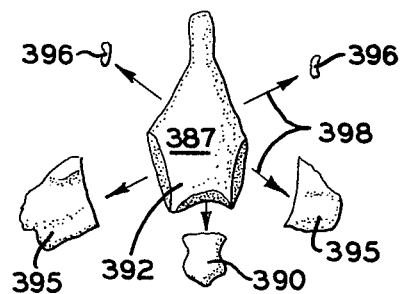
FIG. 11 is a top plan view of a poultry back after processing by the device showing portions of the back as detached therefrom.

Various portions of the strip back are removed during processing by the device 20 as depicted in FIG. 11 and indicated by the arrows 398. The leaf fat portions 395 can be removed by trimming the back along a pair of planes parallel to the longitudinally extending spine 386. The tail 390 can be removed by trimming the strip back along a plane extending transversely of the spine. The kidneys 396 can be removed by drawing them from their points of attachment to the back.

The strip back 385 and the portions thereof are depicted in the Figures at various stages of processing by the device 20. In FIG. 3, the strip back is shown at the position designated by the numeral 400 in the leaf fat trimming station 52 with the leaf fat 395 being trimmed. After trimming, the leaf fat is removed, as indicated by the arrows 401 and the dash lines depicting the leaf fat. In FIGS. 4, 6, and 9, the strip back is shown in the kidney removal station 57, at the position designated by the numeral 403, with a kidney 396 being removed as indicated by the dash arrow 404 in FIG. 4. As shown in FIGS. 3 and 4, the strip back extends downwardly below the spine 386 thereof into engagement with the opposite sides 46 of the slot 45 in the slide 40. In FIG. 9 the strip back is illustrated at the position, designated by the numeral 406, at which the back is received on the upper reach 221 from the chute 150. In FIGS. 7 and 8, the strip back is shown in the tail trimming station 180 at a position, designated by the numeral 408, in which the back is engaged by the saw 249. The path taken by a tail after being severed by the saw into the container 258 is indicated in FIG. 7 by the arrows 409. The strip back is shown in FIG. 5 in a position designated by the numeral 410, being discharged as indicated by the arrow 411 into the container 258 after completion of processing by the device 20.

OPERATION

The operation of the described embodiment of the present invention is believed to be clearly apparent and is briefly summarized at this point. When the device 20 for processing poultry backs is in operation, the lower reach 91 of the first conveyor 70 is continuously driven by the first powered drive mechanism 100. The lower reach moves in a direction, indicated by the arrow 104 in FIG. 1, from the loading end 26 of the frame 21, toward the discharge end 42 of the slide 40. The lower reach carries with it the cleats 92 whose distal edges 94 have the concavities 95 disposed toward the slide, as best shown in FIG. 3. A "strip back" 385, in the condition depicted in FIG. 10 after picking and eviscerating, manually is placed on the pointed end 43 of the slide with the ribs 393 distended transversely oppositely of the central slot 45. The back is positioned in an upright attitude, with the interior side 388 thereof engaging the slide and the spine 386 engaged in the central slot 45 of the slide, so that the back is aligned longitudinally with the slide. The back is positioned so that the tail 390 is disposed toward the discharge end of the slide, that is, toward the chute 150 and the second path. The kidneys 396 are disposed in engagement with the slide oppositely transversely of the upper edge 41 thereof. The back manually is then pushed along the slide so that the exterior or upward side 387 thereof is engaged by one of said cleats for movement with the lower reach. The form of the pointed end of the slide, which diverges upwardly and transversely toward the discharge end facilitates manual positioning of the back on the slide by guiding the back into longitudinal alignment with the slide. Similarly, the enlarged opening 47 of the slide facilitates alignment of the spine 386 with the slot 45. The form of the pointed end also serves to distend the ribs 393 transversely as the back is moved longitudinally of the slide.

Once the strip back 385 is engaged by a cleat 92, no other manual operations are necessary during processing of the back by the device 20. The lower reach 91 urges the back longitudinally along the slide 40 through the leaf-fat removal station 52 and the kidney removal station 57. Such movement is facilitated by the lubrication provided by the water issuing from the spray nozzles 167 onto the slide. The water is wiped along the slide by the interior side 388 of the back and reduces friction between the back and the slide.

As the back 385 passes through the leaf-fat trimming station 52, the back moves into engagement with the cutting edges 116 of the circular saws 115 which continuously are rotated by their respective hydraulic motors 112. The saws are in planes parallel to the first path of movement of the back along the slide 40 which planes are disposed so as to intersect the back along lines substantially dividing the longitudinal leaf-fat portions 395 from the adjacent meaty and bony portions 392. As a result, continued movement of the back along the slide causes the leaf-fat portions to be trimmed from the balance of the back. The detached leaf-fat portions gravitationally are urged to slide downwardly, at the opposite sides of the slide, as indicated by the arrows 401 in FIG. 3, and to fall into the leaf-fat container 118 for disposal.

Continued movement of a back 385 along the slide 40 from the leaf-fat trimming station 52 brings the back into the kidney removal station 57. As the back traverses the kidney removal station, the upward side 387 of the back engages the curved ends 146 of the hold down plates 145 which are disposed toward the loading end 26 of the frame 21. As the back continues to move, the hold down plates urge the back firmly into engagement with the slide as shown in FIGS. 4 and 6. As the meaty and bony portions 392 of the back pass over the vacuum openings 55, said portion disposed toward the vacuum electric switch 345 engages the actuating rod 347, pivoting the rod and electrically closing the switch. Such closure of the switch results in the opening of the vacuum valve 122 and the application of vacuum from the vacuum source to said openings as previously described. When the kidneys 396 individually register with said openings as the back advances along the first path at the position indicated by the numeral 403, the kidneys are urged from the back and are drawn, as indicated by the arrows 404 in FIG. 4, through the open vacuum valve to said source where they are captured for disposal. When the back has passed out of engagement with the actuating rod, the rod returns to its central position resulting, as previously described, in closing of the connection between the openings 55 and the vacuum source.

As a back 385 is transported through the kidney removal station 57, the back reaches the discharge end 42 of the slide 40 and is expelled from between the cleat engaging the back and the slide onto the chute 150. The back gravitationally is urged to slide longitudinally of the chute with the tail 390 forwardly disposed along the transfer path toward the second path and the second conveyor 190 of the tail trimming station 180. The sliding of the back is facilitated by lubrication of the chute provided by the water spray 173 from the nozzle 170.

The back 385 is delivered from the chute 150 along the transfer path onto the upper reach 221 of the endless belt 220 of the second conveyor 190 a the receiving station 212 in the position indicated by the numeral 406 in FIG. 9. At this point the back, from which the leaf-fat 395 has been trimmed and the kidneys 396 removed, has the appearance shown in FIG. 8. The back slides transversely and downwardly of the endless belt until the distal end 391 of the tail 390 engages the planar guide 195, terminating the longitudinal movement of the back along the transfer path. During the final movement of the back along the transfer path the back engages the actuating rod 375 of the starting electric switch 370 pivoting the rod and electrically closing the switch. As previously described, closing this switch causes the belt to be driven from the second powered drive mechanism 230 so that the upper reach moves as indicated by the arrows 244. This movement of the belt carries the back along its transverse dimension into engagement with the cam rail 260, the first rod 272 of the hold down assembly 270, and the support rail 285. As the upper reach continues to move, the back is engaged, as shown in FIG. 8, on the transverse side thereof opposite to the discharge side 27 of the frame 20 by a pair of cleats 225. The narrow cleat 227 engages the back of the spine 386 oppositely of the tail. The wider, angled cleat 226 folds any remaining leaf-fat portions against the distal ends of the ribs and engages the back at said ends. The back is then carried in an upright attitude by the cleats so as to move with the upper reach along the second path toward the circular saw 249.

Referring to FIGS. 5, 6, 7, and 8, as a back 385 moves with the upper reach 221 toward the saw 249, the back is engaged upwardly between the pairs 225 of cleats by the angled length 275 of the first rod 272 of the hold down assembly 270. The angled length presses the back firmly into downward engagement with the upper reach. This engagement is maintained by the hold down length 274 of said rod as the back passes through the portion of the tail trimming station 180 adjacent to the saw. As the back is engaged by the hold down assembly, it substantially simultaneously is engaged by the lifting portion 263 of the cam rail 260 downwardly of the tail and is engaged by the support rail 285 downwardly of the spine and oppositely of the tail. As the upper reach continues to move, carrying the back with it, the tail is forced by its engagement with said lifting portion to an upwardly angled relation with the spine, as shown in FIG. 7. Simultaneously, the spine is raised by engagement with the support rail so as to extend substantially parallel to the upper reach.

The back 385, as previously described, is pressed onto the upper reach 221 of the second conveyor 190 and caused to traverse the second path through the device in a transverse attitude by the engagement of the pair of cleats 225. Simultaneously, the back is positioned, as indicated by the numeral 408 in FIGS. 7 and 8, by the cam rail 260 and support rail 285 so that the plane of the cutting edge 250 of the saw 249, which is parallel to the second path, engages the back where the tail 390 is joined thereto. As a result, continued movement of the upper reach together with the back causes the tail to be trimmed from the back. The tail then is gravitationally urged downwardly of the saw and generally parallel to the planar guide into the trough 255. The tail then is gravitationally urged to slide along the trough into the tail container 258 for packaging or other commercial use.

Continued movement of a back 385 from the saw 249 on the upper reach 221 disengages the processed back from the cam rail 260, hold down assembly 270 and support rail 285. The back is then expelled from the second conveyor 190 by the pair of cleats 225 engaged therewith as the cleats begin to pass downwardly about the pulley 217 adjacent to the tail container 258. The backs, indicated by the numeral 410 in FIG. 5 and whose processing has now been completed by the device 20, are expelled, as indicated by the arrow 411, into the container 295 for further processing to remove the bony portions.

The preceding discussion of the movement of a back 385 through the tail trimming station 180 was prsented as if the upper reach 221 and the back moving therewith continuously were in motion. In actuality, this condition only occurs if backs successively are delivered onto the upper reach from the chute 150 and the first conveyor 70 at the proper intervals so that the clutch 240 continuously is engaged. This condition occurs if the starting switch 370 is always closed by the arrival of a back at the receiving station 212 when the stopping switch 360 was opened by the engagement of a narrow cleat 227 with the actuating rod 365. This condition is not likely to occur for any appreciable length of time, therefore, the upper reach usually moves intermittently as successive backs are delivered onto the receiving stations from the chute. However, during such intermittent movement the engagement of each back by the pair of cleats 225, the cam rail 260, the hold down assembly 270, and the support rail 285 occurs as if the movement of the upper reach were continuous. Similarly, the trimming of each tail 390 and the discharge of each tail and each processed back into their respective containers 258 and 295 occurs during each period of movement of the upper reach as if the movement were continuous.

Automatic movement of the upper reach 221 of the second conveyor 190 is only initiated as basks 385 temporarily engage the actuating rod 365 at the receiving station 212. As a result a plurality of backs will remain on the upper reach when processing of the backs is temporarily discontinued, as at the end of a working day. The processing of these backs can be completed and the device 20 cleared thereof manually by pressing the button 327 of the clutch control solenoid valve 320. As previously described, pressing this button engages the clutch 240 causing the upper reach to move and transport the backs thereon through the balance of their processing by the device 20.

As can be seen from the foregoing description, the device 20 of the present invention automatically and accurately trims the tail 390 and leaf fat 395 from picked and eviscerated strip backs 385 and automatically removes the kidneys 396 therefrom. Such trimming and removal is performed without manual labor except to load the backs into the device and to remove the containers 118, 258, and 295 into which the portions of the original back have been segregated. Manual contact with the back is only required initially to load each back into the device. As a result sanitation is enhanced by use of the present device, while satisfying the other requirements for strip back processing, in modern, high volume processing of "segmented" poultry.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. In a device for processing poultry backs or the like, each having a substantially concave surface, during transport along a path of travel, an improvement comprising a slide member extending along the path of travel having surfaces converging transversely of said path of travel; a conveyor having a transporting run disposed in spaced substantially parallel relation to the slide member and mounting a plurality of panels shaped for individual, substantially fitted engagement with portions of said backs, said panels extending toward the slide member; and means for moving the transporting run of the conveyor along the path of travel whereby a back captured with its concave surface engaging the slide member and a panel in said fitted engagement is transported along the path of travel.

2. The improvement of claim 1 in which each of said poultry backs has a ridge extending along its respective concave surface substantially longitudinally of the back and wherein said surfaces of the slide member of the improvement are convergent to substantially parallel portions extending along the path and spaced to define a slot therebetween dimensioned to receive said ridges to retain the backs in longitudinal alignment with the slide member as the backs are transported along the path of travel.

3. The improvement of claim 2 wherein the slide member has an end portion having surfaces converging toward each other from said converging surfaces of the slide member to define a form in advance of said slide member relative to said path of travel for engagement by the concave interior surfaces of successive poultry backs to distend said surfaces for introduction into substantially facing engagement with the converging surfaces of the slide member and to orient said ridges relative to the slot for receipt therewithin.

4. The improvement of claim 2 including means communicating with one of said converging surfaces of the slide member through an opening therewithin for vacuumatically extracting a portion of each successive poultry back transported along the path of travel and means for operating the extracting means when each successive poultry back is in facing engagement with the converging surface over said opening.

5. The improvement of claim 2 wherein one of said converging surfaces of the slide member has an opening extending therethrough in predetermined spaced relation to the slot and a cutting member is borne by said device and extended through said opening of the converging surface defining a plane substantially parallel to the slot of the slide member for cutting successive backs along said plane as the backs are transported along the path of travel.

6. The improvement of claim 2 wherein each of said poultry backs has a tail portion substantially longitudinally aligned with said ridge and the improvement includes a second conveyor having a transporting run substantially normal to and downwardly of the slot of the slide member, means for transporting said run of the second conveyor along a second path of travel for gravitationally receiving successive poultry backs from the slide member, means substantially parallel to said run of the second conveyor for endward engagement by successive poultry backs to dispose said tail portions thereof overhanging a lateral edge of the transporting run, and means adjacent to said lateral edge for severing the tail portions from successive poultry backs during said transporting along the second path of travel.

7. A device for transporting poultry backs or the like, each having an interior surface, along a path of travel for processing, the device comprising a slide extending along the path of travel having portions converging transversely of said path of travel; a conveyor having a transporting run disposed in spaced substantially parallel relation to the slide and mounting a plurality of members shaped for individual engagement with portions of said backs, said members extending toward the slide; and means for moving the transporting run of the conveyor along the path of travel whereby a back captured with its interior surface engaging the slide and a member in said engagement with a portion of said back is transported along the path of travel.

8. A device for processing picked and eviscerated poultry backs, each back having longitudinal and transverse dimensions, an interior and an exterior and a tail extending longitudinally therefrom toward a distal end, the device comprising:

A. first means conveying the backs successively in an upright attitude longitudinally along a predetermined substantially horizontal first path, including:
  1. an elongated prismatic slide, having a discharge end, longitudinally aligned with the first path and having an upwardly disposed edge upon which each back is positioned with said edge disposed transversely centrally thereof with the interior of the back resting downwardly on the slide and with the distal end of the back disposed toward the discharge end,
  2. a first endless belt having a lower reach extending parallel to the slide and upwardly spaced therefrom,
  3. a first drive mechanism connected to said first belt for powered movement of the lower reach along the first path, and
  4. a plurality of resiliently flexible cleats such mounted on said first belt extending from the lower reach toward the slide to a concave edge adapted to be fitted to and engage the exterior of a back for moving said back along the first path during said powered movement of the lower reach;

B. first means for trimming portions from the backs along a line parallel to the first path while said backs are moving along the first path;

C. second means for conveyings the backs in an upright attitude transversely along a predetermined substantially horizontal second path downwardly of the first path and nearer said discharge end of the slide;

D. second means for trimming said tails from the backs along a line parallel to the second path while said backs are transversing the second path, the second trimming means including:
  1. a cutting edge upwardly of the second conveying means and adjacent to said second path for trimming the tails from the backs, and
  2. a cam rail extending along second conveying means having a lifting portion engaging the tails downwardly thereof and a trimming portion spaced upwardly of the second conveying means to guide the tails into engagement with the cutting edge;

E. means for applying a vacuum to the interiors of said backs to remove portions therefrom as the backs are traversing one of said paths;

F. a chute extending from said discharge end downwardly toward the second path to define a transfer path for movement of the backs between the first and the second paths;

G. a planar guide disposed normal to the transfer path oppositely of the chute from the discharge end of the slide and extending parallel to the second path so that movement of the backs along the transfer path is terminated by engagement of the distal end of the tails with the planar guide;

H. a second endless belt conveyor having an elongated lanar reach longitudinally extending below and coextensive with the second path, the reach transversely extending substantially at right angles to said planar guide toward the chute to receive the backs therefrom at a predetermined receiving station along the second conveyor; and I. a second powered drive mechanism connected to said second conveyor for powered movement of said reach thereof from the receiving station toward the trimming means of the second path.

* * * * *

UNITED STATES PATENT AND TRADEMARK OFFICE
CERTIFICATE OF CORRECTION

PATENT NO. : 4,184,229
DATED : January 22, 1980
INVENTOR(S) : Robert L. Soran

It is certified that error appears in the above-identified patent and that said Letters Patent are hereby corrected as shown below:

Column 1, lines 43 and 44, delete ", as in a moder poultry processing plant, is relatively high";

line 49, delete "de-bonded" and insert ---de-boned---.

Column 2, line 29, delete "Fig. 1" and insert ---Fig. 2---.

Column 4, line 31, delete "bar" and insert ---bars---.

Column 5, line 60, after "Each", delete "slide" and insert ---shaft---.

Column 7, line 9, delete "objection" and insert ---projection---.

Column 8, line 59, delete "uide" and insert ---guide---.

Column 18, line 35, delete "a" and insert ---at---.

UNITED STATES PATENT AND TRADEMARK OFFICE
CERTIFICATE OF CORRECTION

PATENT NO. : 4,184,229

DATED : January 22, 1980

INVENTOR(S) : Robert L. Soran

Page 2 of 2

It is certified that error appears in the above-identified patent and that said Letters Patent are hereby corrected as shown below:

Column 19, line 46, delete "prsented" and insert ---presented---.

Column 20, line 2, delete "basks" and insert ---backs---.

Column 22, line 10, delete "such" and insert ---each---.

line 51, delete "lanar" and insert ---planar---.

Signed and Sealed this

Tenth Day of June 1980

[SEAL]

Attest:

Attesting Officer

SIDNEY A. DIAMOND

Commissioner of Patents and Trademarks